United States Patent
Franklin-Barr et al.

(10) Patent No.: US 8,675,842 B2
(45) Date of Patent: Mar. 18, 2014

(54) SPEECH USAGE AND PERFORMANCE TOOL

(75) Inventors: Belinda Franklin-Barr, Colorado Springs, CO (US); John Rivera, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 746 days.

(21) Appl. No.: 12/750,313

(22) Filed: Mar. 30, 2010

(65) Prior Publication Data

US 2011/0243310 A1    Oct. 6, 2011

(51) Int. Cl.
*H04M 15/00*    (2006.01)

(52) U.S. Cl.
USPC .............. 379/121.04; 379/88.18; 379/100.03; 379/907; 455/405

(58) Field of Classification Search
USPC ............. 379/114.01–115.03, 121.01–121.05, 379/126–127.05, 88.04, 88.01, 88.02, 379/88.17, 88.18, 100.03, 111, 112.06, 379/112.07, 121.04, 907; 455/405; 707/674; 713/188
See application file for complete search history.

(56) References Cited

U.S. PATENT DOCUMENTS

| | | | |
|---|---|---|---|
| 6,539,078 B1 * | 3/2003 | Hunt et al. | 379/88.04 |
| 8,001,089 B2 * | 8/2011 | Tabellion et al. | 707/674 |
| 2003/0110385 A1 * | 6/2003 | Golobrodsky et al. | 713/188 |
| 2007/0173226 A1 * | 7/2007 | Cai et al. | 455/405 |

* cited by examiner

*Primary Examiner* — Md S Elahee

(57) ABSTRACT

A system may include a database configured to selectively store and retrieve data. The system may further include a call record parser configured to receive a plurality of call records, each call record being associated with a respective call, parse the plurality of call records to identify periods of resource usage and types of resource usage for the associated calls, create parsed data based on the identified periods of resource usage and the types of resource usage, and store the parsed data in the database indexed according to the type of the identified resource and including the start and end times for the identified periods of usage.

25 Claims, 7 Drawing Sheets

SPEECH USAGE AND PERFORMANCE TOOL

BACKGROUND

A system may receive a user request, and may utilize various computing devices and licensed software in order to handle the user request. Because concurrent-user licenses can be expensive, a system operator should purchase an optimal number of license seats to balance user demand against licensing cost. However the system operator may require additional information regarding how many licenses to purchase to determine the optimal number of licenses.

DETAILED DESCRIPTION

Figure 1:
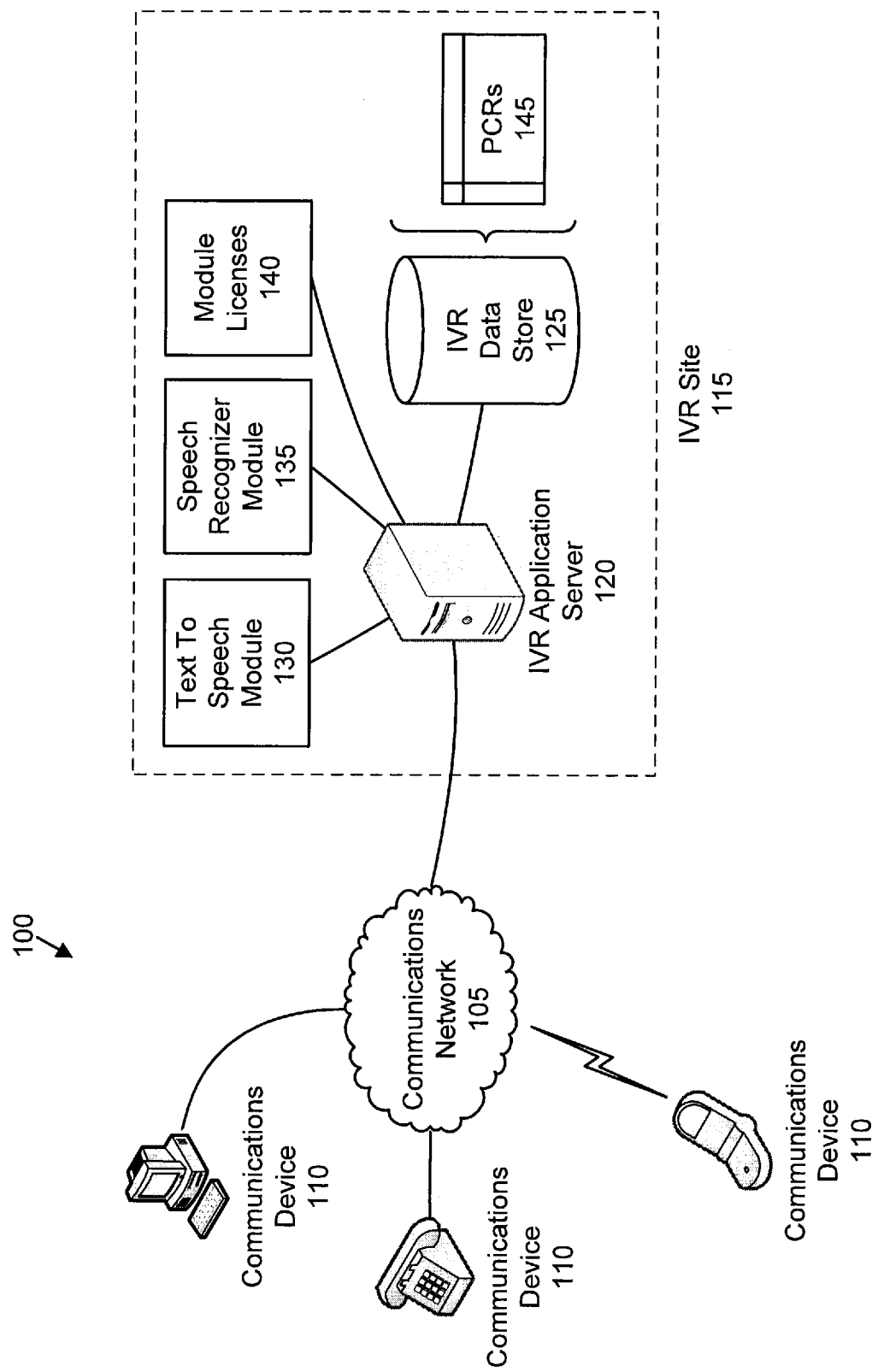
FIG. 1 illustrates an exemplary communications system including an interactive voice response site.

Interactive Voice Response (IVR) applications may be used to allow for the detection and recognition of user input, and to provide results back to the user responsive to the received input. IVR applications may be utilized in various situations, including as an interface to a mapping system for an automobile or other vehicle. Exemplary IVR applications may also be used in telecommunications systems to support functionality including by way of example telephone banking, telephone voting, flight scheduling, movie ticket showtime retrieval, ticket purchase, and credit card transactions. The IVR application may accept input in the form of tones such as dual-tone multi frequency (DTMF) and/or spoken input by way of a speech recognition module.

In an exemplary telecommunications setting, a call from a caller requesting use of an IVR application may be routed or otherwise directed into a calling platform hosting the desired IVR application. The IVR application associated with the IVR site may then query the caller for information pertinent to the call. Additionally, for each call processed on the calling platform, a platform call record (PCR) may be generated that captures specifics of a caller interaction with the IVR site. The PCR for the call may include header information including general information for the call, as well as data captured relating to the specific interactions of the caller with various modules of the IVR application. As some examples, the PCR may include an amount of time each module executes, the specific caller input, responses to the received input, when speech recognition modules were used, and overall system performance.

By examining the PCRs for previously completed calls, a speech usage and performance tool may provide insight into the use and performance of the speech recognition resources. For example, the speech usage and performance tool may be configured to parse the PCRs and precisely pin-point when a speech recognition module is acquired in the call as well as when the caller completes interaction with the speech recognition module. Because speech recognition modules may require the use of speech platform software, and the speech platform software may require licenses to operate, the speech usage and performance tool may therefore provide an ability to more precisely determine the overall need for concurrent speech recognition licenses. To manage licensing costs, the number of concurrent speech recognition licenses to purchase may be updated based on the determined need for concurrent licenses.

Additionally, the speech usage and performance tool may provide system administrators with performance metrics to assess operational improvement after IVR application tuning as well as overall performance under various conditions such as high traffic utilization. These metrics may be utilized to make network changes to improve the network performance.

While IVR functionality related to speech recognition functionality is discussed in particular, it should be noted that other examples of IVR functionality could be similarly analyzed and optimized by the tool, including any functionality for which third-party licensing fees may be due.

FIG. 1 illustrates an exemplary communications system 100 including an IVR site 115. As illustrated in FIG. 1, the exemplary system 100 includes a communications network 105 in selective communication with various communications devices 110. The communications network 105 may further be in selective communication with an IVR site 115 including an IVR application server 120 and an IVR data store 125, where the IVR application server 120 may be associated with various modules (such as the illustrated text-to-speech module 130 and speech recognizer module 135) and module licenses 140, and may generate PCRs 145 to log caller interactions with the IVR site 115.

The communications network 105 may include a mixture of wired (e.g., fiber and copper) and wireless mechanisms that incorporate related infrastructure and accompanying network elements. Illustrative communication networks include a Public Switched Telephone Network (PSTN), a Voice over Internet Protocol (VOIP) network, a cellular telephone network, and a Mobile Internet Protocol (IP) network. The communications network 105 may further include multiple interconnected networks and/or sub-networks that provide communications services, including voice calling and packet-switched network services (including, for example, Internet access and/or VoIP communication services) to at least one communications device 110 (e.g., PSTN telephone, cellular telephone, mobile device, laptop computer, personal digital assistant, portable music player, etc.) connected to the communications network 105.

The communications network 105 may be in selective communication with an IVR site 115. The IVR site 115 may be a telephony platform that operates as an IVR service node in communications with a communications network (i.e., PSTN network, VOIP network, cellular network, the Internet, etc.), and may include computing devices such as one or more application servers 120, IVR data stores 125, and one or more intelligent peripherals configured to implement the functionality of the IVR site 115. The IVR site 115 may be configured, through use of the included devices, to receive calls from the communications network, provide voice responses to a caller, and collect caller input via DTMF signals and/or voice recognition. The IVR site 115 may further be configured to provide call control features including inbound call handling, outbound call delivery, intelligent call routing, comprehensive call conferencing, and call center integration.

As shown, the IVR site 115 may include a text-to-speech module 130 configured to provide synthesized voice prompts and responses to a caller and a speech recognizer module 135 configured to recognize speech spoken by a caller and convert the recognized speech into a form suitable for processing by the IVR site 115. Further, the IVR site 115 may include or otherwise be associated with module licenses 140 that allow for modules (such as text-to-speech module 130 and speech recognizer module 135) to be utilized under the terms of the module license agreement. The IVR site 115 may further include an IVR data store 125 to store IVR data and IVR applications.

In some examples, the IVR site 115 may be configured to be programmed in the VoiceXML (VXML) markup language that may be used program an IVR application to specify interactive voice dialogues between a caller and an IVR site 115. The IVR site 115 may accordingly provide services to the IVR application including audio prompt playback, audio recording, touch-tone interaction, voice recognition, and text-to-speech capabilities scripted in VXML markup language. In some examples, the VXML data may be stored in the IVR data store 125.

While only one IVR site 115 is illustrated in FIG. 1, systems 100 may include multiple IVR sites 115. Further, IVR sites 115 may be of various types and configurations. As one example, an IVR site 115 may be an Internet Protocol (IP) IVR site 115 in selective communication with a Voice over IP (VOIP) network and configured to serve IVR applications for VOIP callers. As another example, an IVR site 115 may be a time division multiplexing (TDM) next generation service node (NGSN) IVR site 115 in selective communication with the public switched telephone network (PSTN) and configured to serve IVR applications to PSTN callers.

An IVR site 115 may be utilized in a system 100 to offload call processing from live call center agents. For example, a PSTN or VOIP call received at a call center may be routed into an IVR site 115 rather than routing the call initially to a call center agent. The IVR site 115 may accordingly query the caller for information pertinent to the call, such as by way of a DTMF input module or the speech recognizer module 135. The IVR site 115 may forward the caller to a call center agent or alternately may dispose of the caller itself without need for an agent. In some examples, if a caller is directed to a call center agent, the call center agent may be capable of directing the caller back into the IVR site 115 to allow the IVR site 115 to continue with automated call processing and disposal. Thus, a caller may interact with various aspects of the IVR site 115 when utilizing an IVR application, including various modules (e.g., text-to-speech module 130, speech recognizer module 135, etc.) and call center agents.

The IVR site 115 may be configured to log or otherwise record PCRs 145 to capture the specifics of these and other caller interactions with the one or more IVR applications. In some instances, a separate PCR 145 may be logged for each call. For example, each PCR 145 may be appended to a log file including multiple PCRs 145, or may be included as a new row in a database table of PCR 145 records, such as in the IVR data store 125.

As a specific example of a caller interaction, a caller may call an 8XX number and be routed to an appropriate IVR site 115. The appropriate IVR site 115 may be determined according to the requested IVR application. If the requested IVR application is speech-enabled, then the caller may be routed to an IVR site 115 having speech-recognition capabilities. Otherwise, the caller may be routed to an IVR site 115 that does not support speech recognition.

In an instance where the IVR application requires speech-recognition capabilities, the caller may be routed to an appropriate IVR site 115, and be immediately greeted by the IVR application. The IVR application may play a recorded message may be played followed by one or more prompts where pieces of information are captured using a speech recognizer module 135. The caller may interact with the speech recognizer module 135 for 60 seconds and then may request to be transferred to a call center agent. The call center agent may take the call and determine that the caller needs to talk to a different department and initiates a transfer. The caller may be put on hold for three minutes until the receiving department has capacity to take the call. Eventually, the receiving department answers and may be in conversation with the caller for six minutes before the caller ends the call. The total call duration of the call may 10 minutes even though the actual usage of the speech recognizer module 135 was only for 60 seconds.

Figure 2:
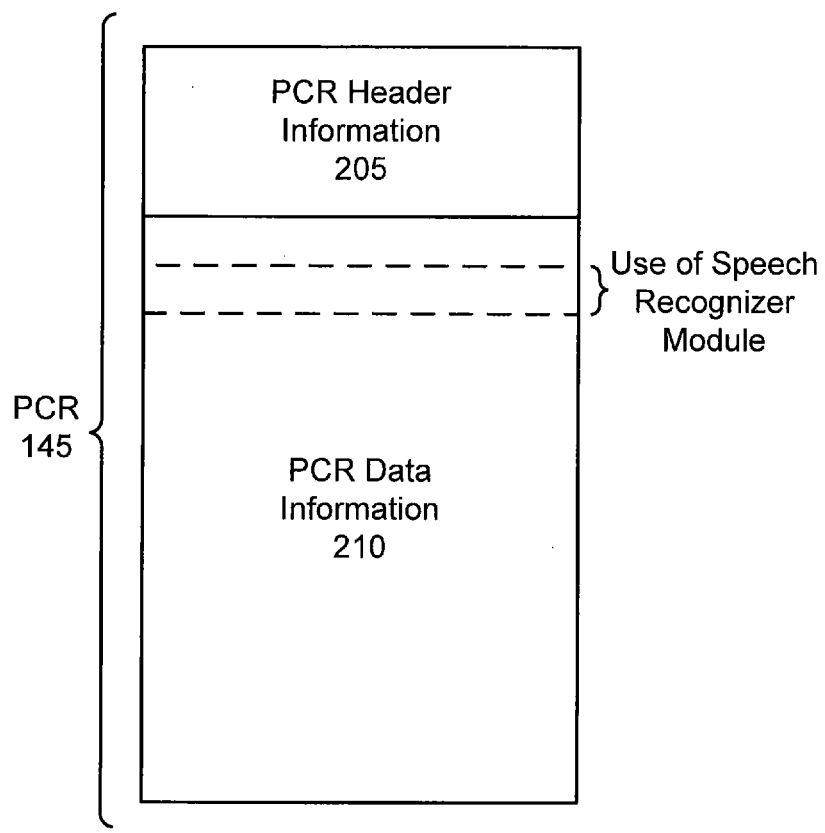
FIG. 2 illustrates an exemplary platform call record.

FIG. 2 illustrates an exemplary PCR 145. The PCR 145 may include header information 205 relating to a call and data information 210 regarding various events that occurred during the processing of the call.

The PCR 145 header information 205 may include one or more items relating to the general disposition of a call, including but not limited to: call start time, network call identifier (NCID), software identifier, trunk group identifier, port, timepoint, sequence number, record version, NGSN node identifier, originating trunk, originating switch, dialed number identification service (DNIS) number, automatic number identification (ANI) number, NSGN port number, IP identifier, call sequence number, origination line information, initial application identifier, initial application identifier version, entry code, and application type.

The PCR 145 data information 210 may include information regarding various events related to the processing of the call. In some instances the data information 210 is arranged chronologically, and may include indications of various functionality utilized during the call. The data information 210 may include entries indicating voice browser (VOSB) usage, such as any VXML files utilized during the call, timing of the start and end of VSML file usage, and identifiers of IVR applications associated with the utilized VSML files. The data information 210 may further include data indicative of periods of module license 140 usage, including start and end times for the usage of various modules (e.g., text-to-speech module 130 and speech recognizer module 135) as well as indications of any associated IVR application. The data information 210 may further include data indicative of overall recognition performance, such as start and end times for recognition events, as well as whether the recognition was success and any associated IVR application. The data information may also include indications of any audio files played during the call and when they were played, received system operator input and when it was received, and any other events or modules associated with the processing of the call. In some examples, the start and end times of events in the PCR 145 data information are indicated relative time offsets into the call, with the header information 205 indicating the actual start time of the call.

A portion of an exemplary call in which a speech recognizer module 135 was used is indicated in FIG. 2. Accordingly, to continue with the previous call example discussed above with respect to FIG. 1, because the PCR 145 may record the details of a caller interaction with the IVR site 115, the PCR 145 for the call may be used to precisely pinpoint when in the call a speech license for the speech recognizer module 135 was acquired and subsequently released. Thus, from the PCR 145 it may be determined that the speech license for the call was only necessary for one minute of the call. Without analysis of the PCR 145, when determining licensing counts the system may have to assume that the speech license was used for the entire duration of the call handled by the speech-recognition capable IVR site 115.

Figure 3:
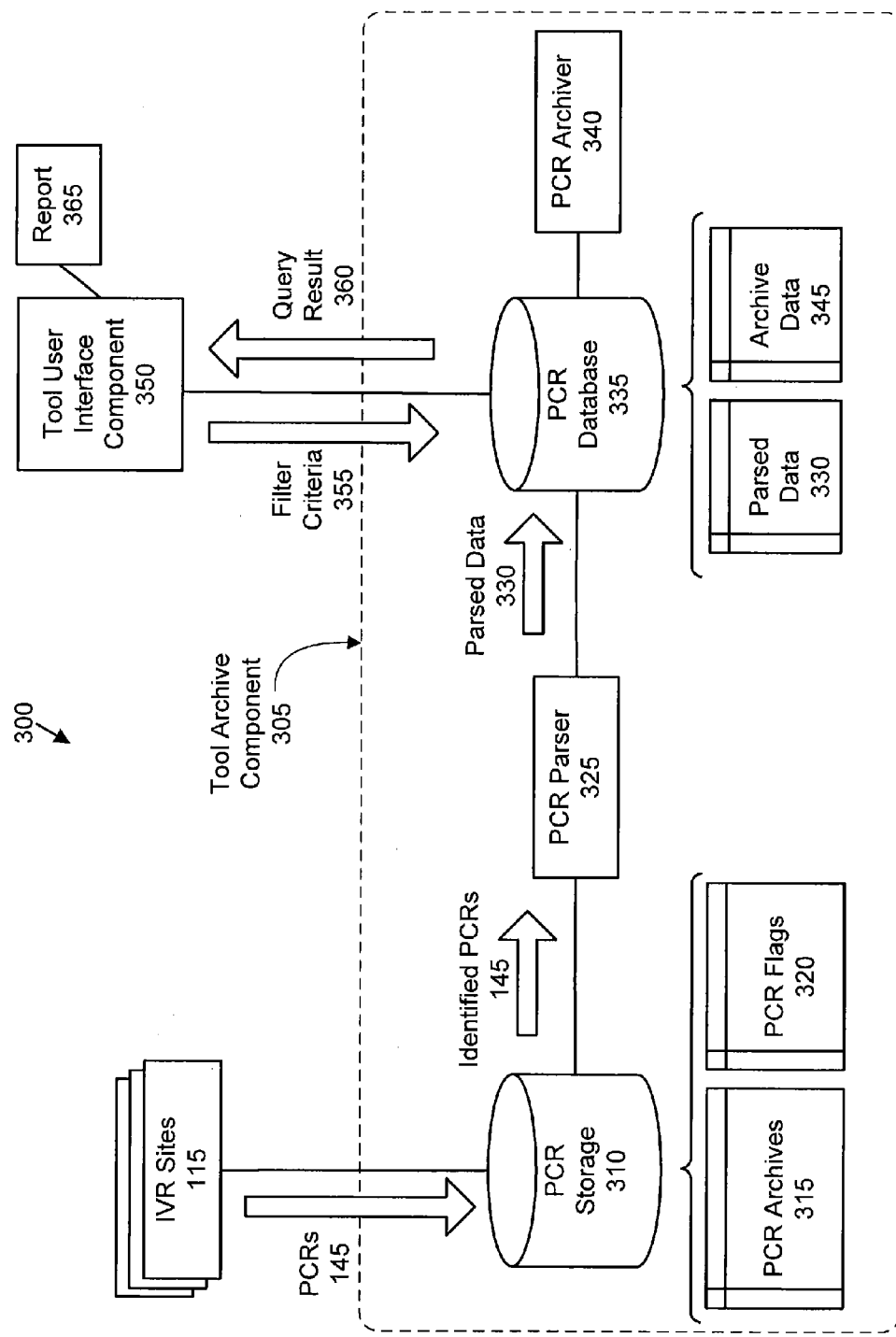
FIG. 3 illustrates a block diagram of an exemplary system including a speech usage and performance tool.

FIG. 3 illustrates a block diagram of an exemplary system 300 including a speech usage and performance tool. As illustrated in FIG. 3, the exemplary system 300 may include one or more IVR sites 115 in selective communication with a tool archive component 305. The tool archive component 305 may include PCR storage 310 configured to store PCR archives 315 and PCR flags 320, a PCR parser 325 configured to parse identified PCRs 145, a PCR database 335 configured to selectively store and retrieve parsed data 330 and archive data 345, and a PCR archiver 340 configured to retrieve old parsed data 330 and produce the archive data 345. The system 300 may further include a tool user interface component 350 in selective communication with the PCR database 335 and configured to send a usage query including filter criteria 355, receive a query result 360, and generate a report 365 for display. System 300 may take many different forms and include multiple and/or alternate components and facilities. While an exemplary system 300 is shown in FIG. 3, the exemplary components illustrated in Figure are not intended to be limiting. Indeed, additional or alternative components and/or implementations may be used.

The system 300 may include one or more IVR sites 115 that may serve as sources of PCRs 145. The system 300 may further include a tool archive component 305 having one or more computing devices and/or storage devices. Accordingly, the various logical components of the tool archive component 305, such as the PCR storage 310, PCR parser 325, PCR database 335, and PCR archiver 340, may be implemented by way of the computing and storage devices of the tool archive component 305.

The PCR storage 310 may be used to receive PCRs 145 and to store the PCRs 145 for later parsing and analysis. The PCR storage 310 may accordingly include a PCR archives 315 storage area for the received PCRs 145, such as a directory to store incoming PCRs 145 as a listing of files. One implementation of the PCR archives 315 storage may name the received PCRs 145 with a timestamp indicative of the time period covered by the received PCRs 145. In some examples, the PCR storage 310 may include a database to store the incoming PCRs 145 rather than one or more directories of files.

PCRs 145 may be accumulated at the one or more IVR sites 115 and sent for storage to the PCR archives 315. The accumulated PCRs 145 may be sent according to various heuristics, such as one or more of a predetermined time interval heuristic indicating a time interval at which to send accumulated PCRs 145, a file size heuristic indicating a predetermined amount of data at which to send accumulated PCRs 145, and a number of calls heuristic indicating a completed number of calls at the IVR site 115 upon which to send accumulated PCRs 145. As some examples, PCRs 145 may be cut every 15 minutes according to a predetermined time interval heuristic of every 15 minutes, and/or cut when the file reaches a size of 30 kilobytes according to a file size heuristic of 30 kilobytes. Received PCRs 145 may be named in various schemes, such as consecutively, or according to a timestamp generated upon sending or receipt.

To allow for selective parsing of the PCR archives 315, the PCR storage 310 may further include PCR flags 320 including identifiers of PCR 145 flagged for parsing. One implementation of the PCR flags 320 storage area may be as a directory of zero-length files having filenames corresponding to filenames of PCRs 145 in the PCR archives 315 to be parsed. Such an implementation may reduce the amount of I/O and disk space used, and may also ensure that the original PCR 145 files are not altered or deleted accidentally. In other examples, the PCR flags 320 may be implemented by way of entries in a database, such as a flag column indicating which stored PCRs 145 are flagged for parsing. In some examples, a computer program (e.g., a script) executed by an IVR site 115 or the tool archive component 305 may monitor the PCR archives 315 area for new PCRs 145 and may copy PCR identifiers indicative of the new PCRs 145 to the PCR flags 320 area. In other examples, PCR 145 identifiers may be included in the PCR flags 320 by manual system operator instruction.

The PCR parser 325 may be implemented by way of one or more computing devices included in the tool archive component 305 and may be configured to parse the identified PCRs 145 into parsed data 330. For example, the PCR Parser 325 may retrieve the zero-length files from the PCR flags 320, and may parse the filenames of the retrieved files to determine from where to retrieve the identified PCR 145 file. The PCR parser 325 may further be configured to retrieve and parse the identified PCRs 145, and delete the flagging of the PCRs 145 indicated in the PCR flags 320 (e.g., by deleting the corresponding zero-length files) once the indicated PCRs 145 have been parsed.

With regard to the parsing, as indicated above, each PCR 145 may include header information 205 including overall information about an associated call, and also data information 210 regarding various events related to the processing of the call. The data information 210 may include specific caller input, responses to the received input, and amounts of time for which each module utilized during the call was utilized. The PCR parser 325 may read in the PCR 145 header information 205 and data information 210, and may analyze the header information 205 and data information 210 to determine what periods of time during the call that various modules were utilized.

The PCR parser 325 may accordingly be configured to generate parsed data 330 including at least a subset of the header information 205 of the PCRs 145 to facilitate further analysis and searching of the parsed data 330, as well as data information 210 including events organized according to start and end time. Accordingly, the PCR parser 325 may save storage space in the system 300 and may improve scalability by only retaining the particular information relevant to the speech usage and performance tool.

In particular, the PCRs 145 may be parsed into parsed data 330 including several data tables, each table including rows of specific information related to a particular portion of IVR site 115 functionality.

One exemplary parsed data 330 table may be configured to include PCR 145 header information 205 and data information 210 indicative of periods of module license 140 usage, such as for licenses to use the speech recognizer module 135. The exemplary speech license table may include columns such as: NCID, speech recognition start time, speech recognition end time, associated application identifier, and associated service-independent building block (SIBB) if a SIBB is identified by the PCR 145 as utilized to support a portion of a speech feature for which a license was required. Rows of data may be added to the speech license table utilizing data parsed from the indicated PCRs 145.

The parsed data 330 may include a recognition performance table, where the recognition performance table includes PCR 145 header information 205 and data information 210 indicative of overall speech recognition performance. The exemplary recognition performance table may include columns such as: NCID, recognition start time, recognition end time, speech recognizer server, recognition confidence, and an associated application identifier. Rows of data may be added to the recognition performance table utilizing data parsed from the indicated PCRs 145.

The parsed data 330 may include a text-to-speech table, where the text-to-speech table includes PCR 145 header information 205 and data information 210 indicative of periods of text-to-speech module 130 usage. The text-to-speech table may include columns such as: NCID, text-to-speech starting time, text-to-speech ending time, text-to-speech server identifier, an active speech identifier flag indicating whether the text-to-speech was performed on-the-fly, and an associated application identifier. Rows of data may be added to the text-to-speech table utilizing data parsed from the indicated PCRs 145.

The parsed data 330 may include a VOSB usage table, where the VOSB usage table includes a subset of the PCR 145 header information 205 and data information 210 indicative of periods of VOSB usage. The exemplary VOSB usage table may include columns such as: NCID, VXML start time, VXML end time, and associated application identifier. Rows of data may be added to the VOSB usage table utilizing data parsed from the indicated PCRs 145.

The PCR database 335 may be implemented by way of one or more storage devices included in the tool archive component 305, and may be configured to selectively store and retrieve data. The PCR database 335 may accordingly be configured to receive parsed data 330 from the PCR parser 325, and store the parsed data 330 for later retrieval.

The tool user interface component 350 may be in selective communication with the tool archive component 305, e.g., in communication with the PCR database 335. The tool user interface component 350 may be configured to receive and validate login information, receive input from an operator, determine filter criteria 355 according to the operator input, and send a usage query including the filter criteria 355 to the tool archive component 305 responsive to the operator input. The tool user interface component 350 may further be configured to receive a query result 360 from the tool archive component 305 responsive to the query, and display a report 365 according to the query result 360 to the operator responsive to the operator input.

Filter criteria 355 may be used to determine the scope of the parsed data 330 to receive. As some examples, filter criteria 355 may include, but by no means be limited to: network call identifier (NCID), node identifier, DNIS identifier, application identifier, language identifier, start date, end date, start time of day, end time of day, and time interval for data aggregation. The filter criteria 355 may correspond to data columns in the parsed data 330, and may therefore be used to filter the parsed data 330 for retrieval, such as data stored in the exemplary recognition performance table, text-to-speech table, VOSB usage table, and speech license table discussed above.

Exemplary reports 365 may be created by the tool user interface component 350 using data returned based on queries of the parsed data 330 according to the desired filter criteria 355. The reports 365 may include parsed data 330, as well as information determined based on the parsed data 330, such as a maximum number of concurrent users of an identified type of resource during a time period and a number of concurrent speech resource licenses required for use of the identified type of resource based on the maximum number of concurrent users. Reports 365 may be used to update a number of concurrent speech resource licenses available for use by one or more IVR sites 115, such as based on the number of concurrent speech resource licenses required. In some instances, reports 365 may be displayed to an operator, and may include graphical representations of the parsed data 330. Reports 365 are illustrated in further detail below with respect to FIGS. 4 and 5.

In some instances, an operator may schedule reports 365 to be delivered periodically to a recipient based on the filter criteria 355. For example, an operator may create a properties file including filter criteria 355 and an address to which the report 365 may be sent (e.g., an e-mail address, a phone number, etc.). This properties file may be scheduled to periodically run the report 365 (e.g., 5:00 PM every Friday), and to send the periodic report 365 to the indicated address. The properties field may be generated manually, or by the user interface component 350 upon entry of filter criteria 355, address, date/time and period by an operator into the user interface component 350.

The PCR archiver 340 may be implemented by way of one or more computing devices included in the tool archive component 305. The PCR archiver 340 may be configured to maintain the PCR database 335 at a manageable size by creating predefined archive data 345 based on the parsed data 330, and then removing the parsed data 330 used to generate the archive data 345. In some instances, the PCR archiver 340 may be configured to retrieve parsed data 330 from the PCR database 335 that is older than a predetermined time heuristic (such as older than 30 or 60 days), and generate archive data 345 based on the retrieved parsed data 330. For example, the PCR archiver 340 may periodically query the PCR database 335 for data older than as indicated by the predetermined time heuristic using information stored in the parsed data 330 tables indicative of the dates of the associated calls.

The archive data 345 may be generated according to predefined filter criteria 355. Thus, the archive data 345 generated by the PCR archiver 340 may therefore represent one or more archived views of the parsed data 330. Exemplary filter criteria 355 may include queries for cumulative module licenses in use over a period of time, peak use of module licenses over a time period, and queries for IVR application performance across all IVR sites 115. Once the archive data 345 is generated, the PCR archiver 340 may further be configured to delete the parsed data 330 older than the predetermined time heuristic to conserve resources of the PCR database 335.

Accordingly, the archive data 345 may provide one or more predefined views of the parsed data 330 without requiring continued storage of the underlying parsed data 330 required to create the archive data 345. It should be noted that if a request for a report 365 is received, and if no parsed data 330 is available to create the report 365, then either the report 365 cannot be provided, an archive data 345 may instead be provided in place of the report 365, or the requisite PCRs 145 may be required to be parsed again by the PCR parser 325 to generate the appropriate parsed data 330 from which to generate the report 365. In other words, the archive data 345 may be utilized to show predefined views of the PCRs 145, but may not provide the ability to perform interactive analysis with custom filter criteria 355 that is possible for time periods in which the parsed data 330 has been maintained.

Figure 4:
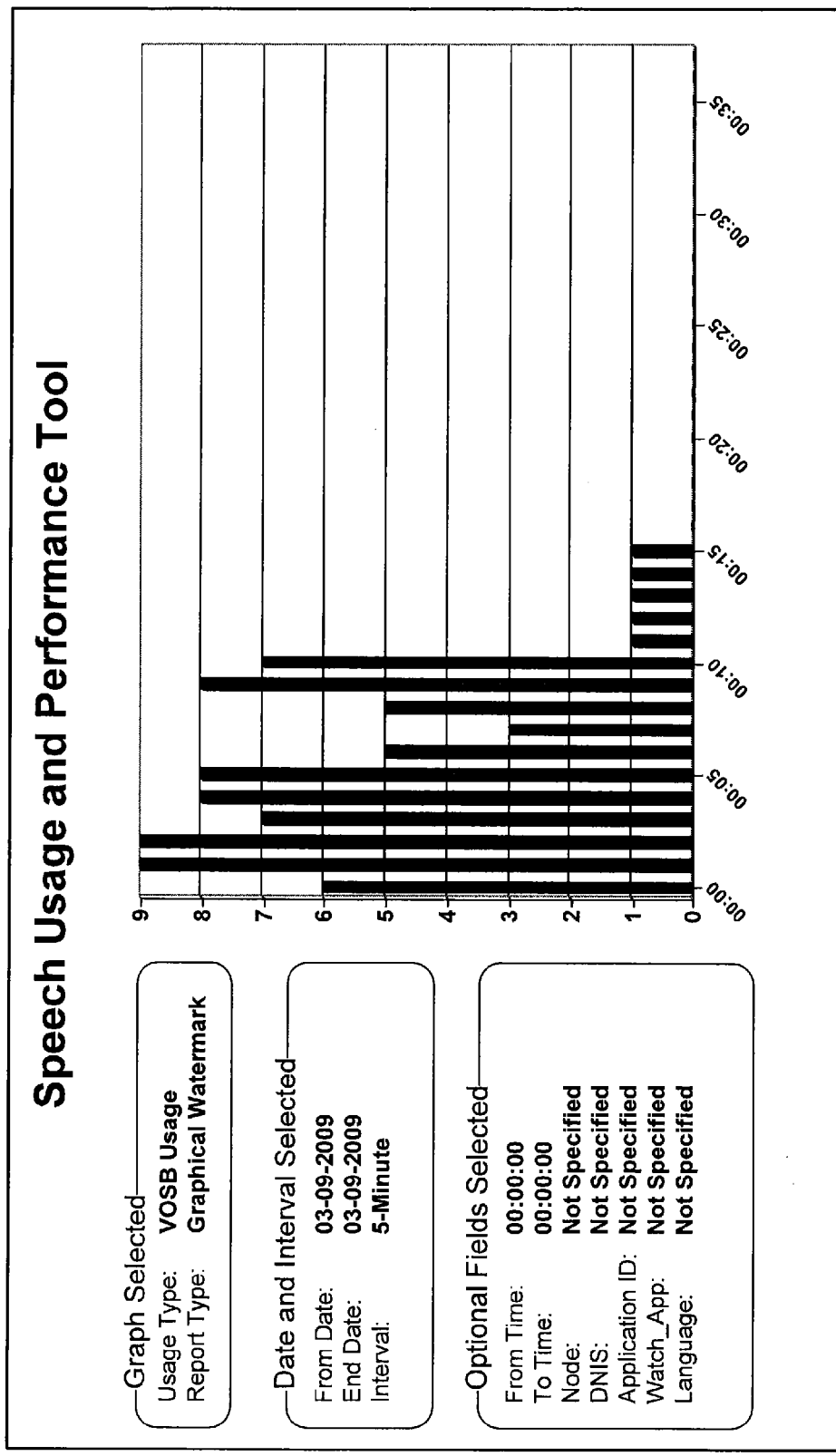
FIG. 4 illustrates an exemplary report provided by a speech usage and performance tool.

FIG. 4 illustrates an exemplary report 365-A provided by a speech usage and performance tool. The exemplary report 365-A includes a graphical representation of VOSB usage indicating concurrent VOSB usage across an enterprise. As illustrated, the exemplary report 365-A is filtered according to a date and time interval. The X-axis indicates the particular time period, and the Y-axis indicates the simultaneous number of accesses over the time period. An analyst may therefore use the information to determine a maximum number of concurrent licenses required for the indicated VOSB usage. Alternately, the speech usage and performance tool may automatically determine the number of concurrent licenses required. A system operator may subsequently filter the information to provide, for example, usage for a specific site (e.g., by filtering according to NGSN node identifier). To manage licensing costs, the number of concurrent licenses to purchase may be updated based on the determined need for concurrent licenses.

Figure 5:
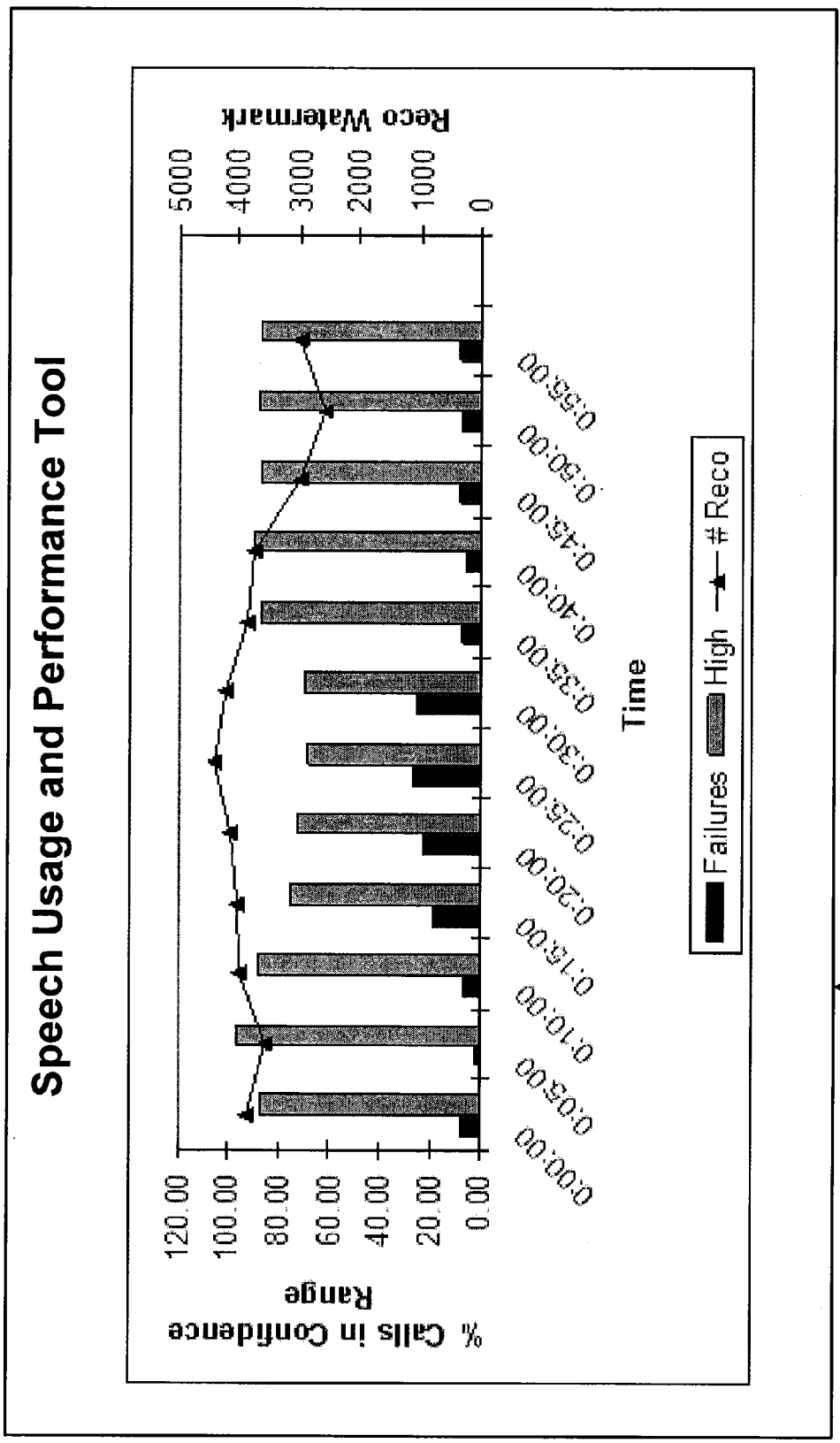
FIG. 5 illustrates another exemplary report provided by a speech usage and performance tool.

FIG. 5 illustrates another exemplary report 365-B provided by a speech usage and performance tool. The exemplary report 365-B relates to speech performance monitoring, and provides an example of how the speech performance tool may displays recognition accuracy compared with concurrent recognition accuracy. The bars in the graph labeled "Failure" reflect a percent of calls for the indicated time period in which speech recognition failures were reported by speech recognizer modules 135. The bars in the graph labeled "High" indicate a percent of calls for the indicated time period wherein the caller speech recognition was indicated as being within the confidence range (i.e., successful) by the speech recognizer modules 135. The "# Reco" trend line indicates the overall number of callers utilizing recognition functionality over the same time period.

As shown in FIG. 5, the percent of failures increases with call volume. Thus, the exemplary illustrated report 365-B may suggest a correlation between recognition accuracy and load. An analyst reviewing the report 365-B may accordingly determine a potential correlation, and further filter the parsed data 330 shown in the report 365-B, such as by way of additional or narrower filter criteria 355. The analyst may use a further filtered report 365 to determine if there was indeed a correlation and therefore a potential need for a capacity augment, such as adding additional capacity to an overloaded IVR site 115. Based on the report 265-B, additional capacity may therefore be added to the overloaded IVR site 115.

Additionally or alternatively, the analyst may determine a potential problem with a single IVR site 115 that requires greater analysis. Thus, if a problem is determined to potentially be at a particular IVR site 115, a report 365 may be requested using filter criteria 355 limiting the report 365-B to the particular IVR site 115 in question.

In general, computing systems and/or devices, such as IVR site 115, PCR parser 325, PCR archiver 340, and tool user interface component 350 may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Examples of computing devices include, without limitation, a computer workstation, a server, a desktop, notebook, laptop, or handheld computer, or some other known computing system and/or device.

Computing devices generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein such as IVR data store 125 and PCR database 335 may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 6:
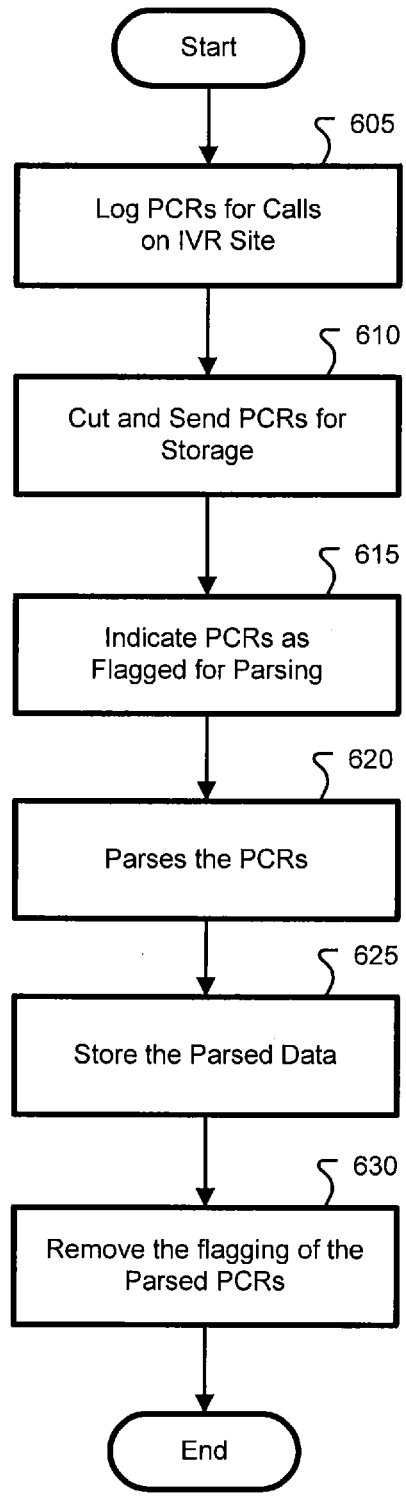
FIG. 6 illustrates an exemplary process flow for receiving and parsing platform call records.

FIG. 6 illustrates an exemplary process 600 for receiving and parsing PCRs 145. The process 600 may be performed by a system including a speech usage and performance tool, such as by the system 300 illustrated and described in detailed with respect to FIG. 3.

In block 605, an IVR site 115 logs PCRs 145 for calls completed on the IVR site 115. For example, one or more callers may interact with an IVR application hosted by the IVR site 115 by way of a plurality of calls.

In block 610, the IVR site 115 may cut and send the PCRs 145 to a tool archive component 305 of the speech usage and performance tool. For example, the tool archive component 305 may receive PCRs 145 from the IVR sites 115, and maintain the received PCRs 145 in a PCR storage 310 data store.

In block 615, the speech usage and performance tool indicates PCRs 145 as being flagged for parsing. For example, a computer program (e.g., a script) executed by an IVR site 115 or the tool archive component 305 may monitor the PCR archives 315 area for new PCRs 145 and may identify PCRs 145 for parsing. The script may then create zero-length files named according to the identified PCRs 145, and store the zero-length files in the PCR flags 320 area to indicate which of the PCRs 145 are to be parsed.

In block 620, the speech usage and performance tool parses the PCRs 145. For example, a PCR parser 325 included in the tool archive component 305 may parse the identified PCRs 145 into parsed data 330 according to the header information 205 and data information 210 of the PCRs 145. Exemplary parsed data 330 may include rows in several data tables, each table including specific information related to a particular portion of IVR site 115 functionality. For example, the parsed data 330 may include speech license table including speech module licensing information, a text-to-speech table including text-to-speech information, a VOSB usage table including information on VOSB usage, and a recognition performance table including information on overall speech recognition performance.

In block 625, the speech usage and performance tool stores the parsed data 330. For example, a PCR database 335 included in the tool archive component 305 may selectively store the parsed data 330 for further selective retrieval.

In block 630, the speech usage and performance tool may remove the flagging of the PCRs 145 indicated as being flagged for parsing. For example, the PCR parser 325 may delete the flagging of the PCRs 145 indicated in the PCR flags 320 once the indicated PCR log files have been parsed. After block 630, process 600 ends.

Figure 7:
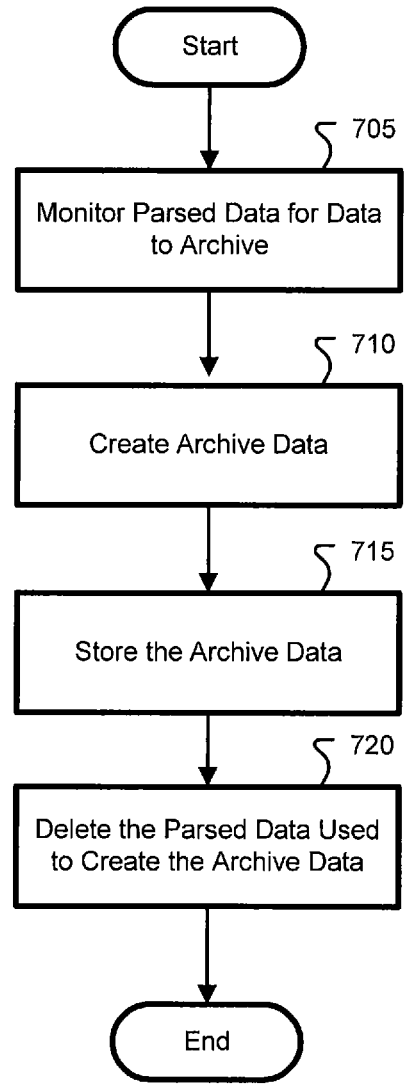
FIG. 7 illustrates an exemplary process flow for creating predefined archive data.

FIG. 7 illustrates an exemplary process 700 for creating archive data 345 for use in the generation of predefined reports 365. As with process 600, the process 700 may be performed by a system including a speech usage and performance tool, such as by the system 300 illustrated and described in detailed with respect to FIG. 3.

In block 705, the speech usage and performance tool monitors parsed data 330 for data to archive. For example, a PCR archiver 340 included in a tool archive component 305 of the speech usage and performance tool may monitor the dates of parsed data 330 included in a PCR database 335 stored by the tool archive component 305. The PCR archiver 340 may further determine that at least a subset of the parsed data 330 stored by the tool PCR database 335 is older than a predetermined time heuristic, for example by periodically querying the PCR database 335 for data older than as indicated by the predetermined time heuristic. An exemplary predetermined time heuristic may indicate to archive parsed data 330 that is older than 30 or 60 days.

In block 710, the speech usage and performance tool creates archive data 345 based on the parsed data 330 identified to be archived. For example, the PCR archiver 340 may generate archive data 345 based on the retrieved parsed data 330 according to predefined filter criteria 355. Exemplary predefined filter criteria 355 may include queries for cumulative module license in use over a period of time, peak use of module licenses over a time period, and queries for indicated application performance across all IVR sites 115.

In block 715, the speech usage and performance tool stores the archive data 345. For example, the PCR archiver 340 may store the generated archive data 345 in the PCR database 335.

In block 720, the speech usage and performance tool deletes the parsed data 330 used to create the archive data 345. For example, the PCR archiver 340 may delete the identified parsed data 330 from the PCR database 335 to conserve database resources. Next the process 700 ends.

Figure 8:
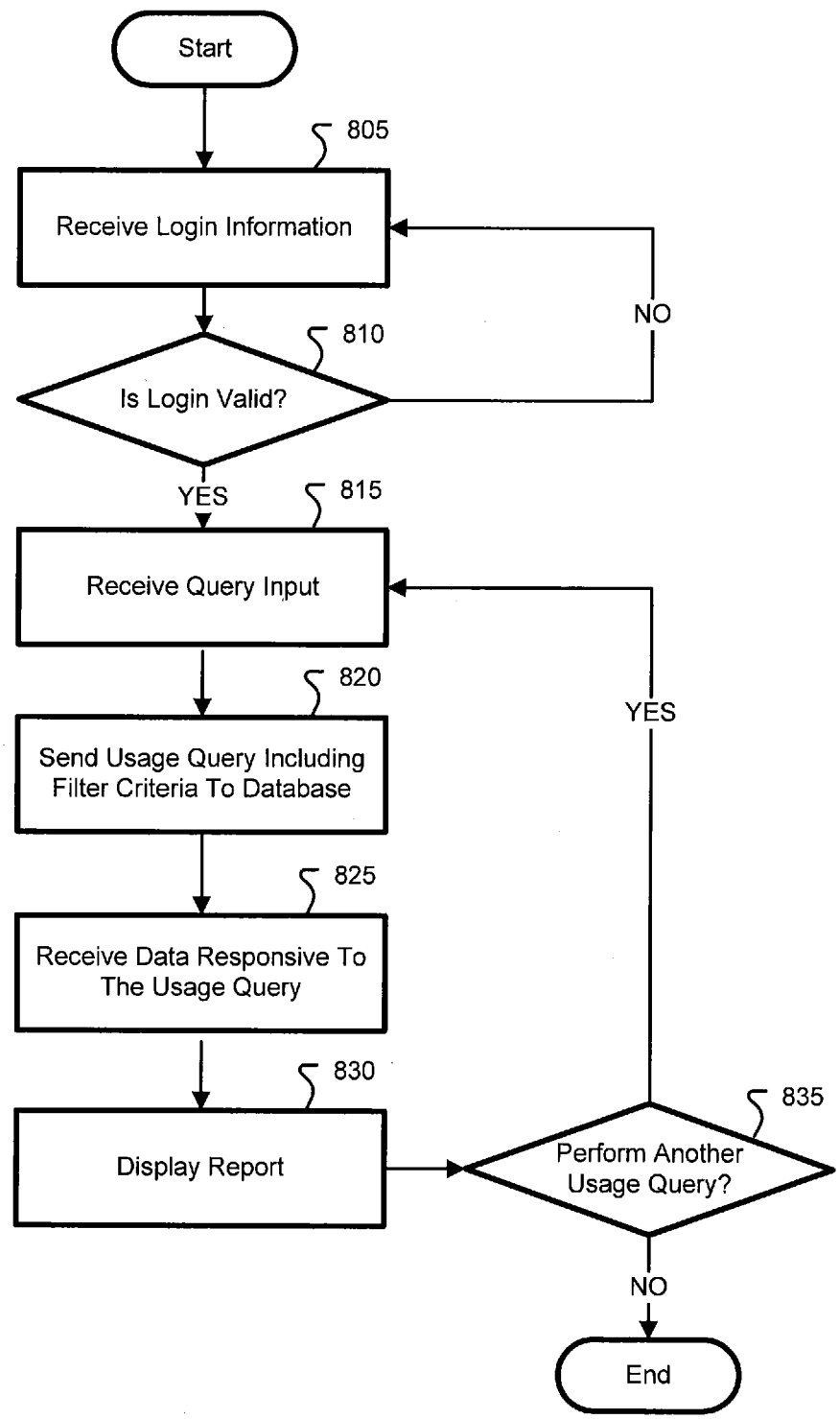
FIG. 8 illustrates an exemplary process flow for querying data by way of a speech usage and performance tool.

FIG. 8 illustrates an exemplary process 800 for displaying reports by way of a speech usage and performance tool. As with processes 600 and 700, the process 800 may be performed by the system 300 illustrated and described in detailed with respect to FIG. 3.

In block 805, the speech usage and performance tool receives login information. For example, a tool user interface component 350 included in the speech usage and performance tool may receive a username and a password from a system operator.

In decision point 810, the speech usage and performance tool validates the username and password. If the login information is determined to be valid, block 815 is executed next. Otherwise, block 805 is executed next or the process 800 ends.

In block 815, the speech usage and performance tool receives query input. For example, the tool user interface component 350 may receive input from a system operator, and may determine filter criteria 355 according to the operator input. As some examples of filter criteria 355, the filter criteria 355 may include one or more of NCID, node identifier, DNIS identifier, Application identifier, language identifier, start date, end date, start time of day, end time of day, and time interval for data aggregation.

In block 820, the speech usage and performance tool requests data from the PCR database 335. For example, the tool user interface component 350 may send a usage query to the PCR database 335 including the determined filter criteria 355. The PCR database 335 may in turn receive the usage query.

In block 825, the speech usage and performance tool receives data responsive to the usage query. For example, the PCR database 335 may determine whether archive data 345 is requested based on the determined filter criteria 355, such as by determining whether the requested data is older than a predetermined time heuristic after which parsed data 330 may be archived. In other examples, PCR database 335 may query for the requested parsed data 330 directly, and if no parsed data 330 is present, the PCR database 335 may then query for archive data 345. In still other examples, the request may explicitly indicate that archive data 345 is being requested. In any event, the PCR database 335 may return either parsed data 330 or archive data 345 responsive to the request including the determined filter criteria 355.

In block 830, the speech usage and performance tool displays a report 365 based on the received parsed data 330 and/or archive data 345. Exemplary reports 365 are illustrated above with respect to FIGS. 4 and 5.

In decision point 835, the speech usage and performance tool determines whether another query is to be performed. For example, a system operator may elect to perform further usage queries to further filter the parsed data 330 shown in the report 365, such as by way of broader or narrower filter criteria 355. If another query is to be performed, block 815 is executed next. Otherwise, the process 800 ends.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
a database configured to selectively store and retrieve data; and
a call record parser including a computing device and configured to:
  receive a plurality of call records, each call record being associated with a respective call and including timing information indicative of resource module usage utilized by said respective call, said timing information being indicated using relative time offsets into said respective call,
  parse said plurality of call records by the computing device to identify, based on said timing information, periods of resource module usage by time of day and types of resource module usage that occurred during said associated calls,
  create parsed data by the computing device based on said identified periods of resource module usage and said types of resource module usage, and
  store said parsed data in said database indexed according to said type of said identified resource module usage and including the start and end times for said identified periods of resource module usage by time of day,
the database configured to:
  receive a usage query including filter criteria, the filter criteria indicating a period of time with which to query for information relating to the plurality of call records; and
  send a query result to the usage query responsive to the filter criteria.

2. The system of claim 1, wherein said type of resource module usage includes at least one of usage of a speech recognition module, usage of a text-to-speech module, and usage of a voice browser module.

3. The system of claim 1, wherein said plurality of call records includes platform call records received from at least one interactive voice response site.

4. The system of claim 3, wherein at least one of said interactive voice response sites is configured to send at least a portion of said plurality of call records according to at least one of:
  (a) a predetermined time interval heuristic indicating a time interval at which to send accumulated call records;
  (b) a file size heuristic indicating a predetermined amount of data at which to send accumulated call records; and
  (c) a number of calls heuristic indicating a completed number of calls upon which to send accumulated call records.

5. The system of claim 1, further comprising a user interface in selective communication with said call record database and configured to:
  send the usage query to said call record database including the filter criteria;
  receive the query result from said call record database; and
  display a report including information based on said query result.

6. The system of claim 5, wherein said filter criteria include at least one of: a type of resource module usage, a network call identifier, a node identifier, a dialed number identification service identifier, an application identifier, a language identifier, a start date, an end date, a start time of day, an end time of day, and a time interval for data aggregation.

7. The system of claim 1, further comprising a call data archiver in selective communication with said database and configured to:
  monitor said parsed data to identify parsed data to archive;
  create archived data based on said identified parsed data according to predefined filter criteria; and
  store said created archived data in said database.

8. The system of claim 7, wherein said call data archiver is further configured to delete said identified parsed data after creating said archived data to conserve database resources.

9. The system of claim 7, wherein said call data archiver is configured to monitor said parsed data for archiving by periodically querying said database for data older than a threshold age as indicated by a predetermined time heuristic.

10. The system of claim 7, wherein said predefined filter criteria include at least one of:
  (a) a query of said parsed data for cumulative resource module licenses in use over the period of time;
  (b) a query of said parsed data for peak use of resource module licenses over the period of time; and
  (c) a query of said parsed data for interactive voice response application performance across interactive voice response sites.

11. The system of claim 1, further comprising an interface in selective communication with said call record database and configured to:
  send a second usage query to said call record database including filter criteria identifying a type of resource module usage;
  receive, in response to the second usage query, a second query result from said call record database including parsed data according to said filter criteria;
  determine a maximum number of concurrent users of said identified type of resource module usage based on said second query result;
  determine a number of concurrent speech resource module licenses required for use of said type of identified resource module usage based on said determined maximum number of concurrent users; and
  update a number of concurrent speech resource module licenses available for use based on said determined number of concurrent speech resource module licenses required.

12. A method, comprising:
receiving a plurality of call records, each call record being associated with a respective call and including timing information indicative of resource module usage utilized by the respective call, the timing information being indicated using relative time offsets into the respective call;

parsing the plurality of call records by a computing device to identify, based on the timing information, periods of resource module usage by time of day and types of resource module usage that occurred during the associated calls;

creating parsed data by the computing device based on the identified periods of resource module usage and types of resource module usage; and storing the parsed data in a database indexed according to the type of the identified resource module usage by time of day and including the start and end times for the identified periods of usage, receiving at the database a usage query including filter criteria, the filter criteria indicating a time period with which to query for information relating to the plurality of call records; and sending a query result to the usage query responsive to the filter criteria.

13. The method of claim 12, wherein the plurality of call records includes platform call records received from at least one interactive voice response site, and the type of resource module usage includes at least one of usage of a speech recognition module, usage of a text-to-speech module, and usage of a voice browser module.

14. The method of claim 12, further comprising:
determining the filter criteria according to input received from a system operator; and
displaying a report including information based on the query.

15. The method of claim 14, further comprising:
displaying a report including a determination of a maximum number of concurrent users of an identified resource module during the time period based on the parsed data.

16. The method of claim 15, wherein the identified resource module is licensed according to number of concurrent users, and further comprising displaying a determination of a number of concurrent resource module licenses required to utilize the identified resource module based on the determined maximum number of concurrent users.

17. The method of claim 15, further comprising displaying a determination of a maximum number of concurrent users of the identified resource module during the time period based on the parsed data concurrent with a determination of recognition accuracy of the at least one identified resource module.

18. The method of claim 12, further comprising:
monitoring the parsed data to identify data to archive,
creating archived data based on the parsed data identified to be archived according to predefined filter criteria, and
storing the generated archived data in the database.

19. The method of claim 18, further comprising deleting the identified parsed data from the database after creating the archived data to conserve database resources.

20. The method of claim 12, further comprising:
determining a maximum number of concurrent users of an identified type of resource module during the time period based on the parsed data;
determining a number of concurrent speech resource module licenses required for use of the identified type of resource module based on the determined maximum number of concurrent users; and
updating a number of concurrent speech resource module licenses available for use based on the number of concurrent speech resource module licenses required.

21. A computer-readable medium tangibly embodying computer-executable instructions configured to cause a computing device to perform operations comprising:
receiving a plurality of call records, each call record being associated with a respective call and including timing information indicative of resource module usage utilized by the respective call, the timing information being indicated using relative time offsets into the respective call;
parsing the plurality of call records by a computing device to identify, based on the timing information, periods of resource module usage by time of day and types of resource module usage that occurred during the associated calls;
creating parsed data by the computing device based on the identified periods of resource module usage and types of resource module usage;
storing the parsed data in a database indexed according to the type of the identified resource module usage and including the start and end times for the identified periods of resource module usage by time of day;
receiving a usage query by the call record database including filter criteria, the filter criteria indicating a period of time with which to query for information relating to the plurality of call records; and
sending a query result to the usage query from the call record database responsive to the filter criteria.

22. The computer-readable medium of claim 21, further comprising instructions configured to cause the computing device to perform operations comprising:
monitoring the parsed data to identify data to archive;
creating archived data based on the parsed data identified to be archived according to predefined filter criteria;
storing the generated archived data in the database; and
deleting the identified parsed data from the database to conserve database resources.

23. The computer-readable medium of claim 21, further comprising instructions configured to cause the computing device to perform operations comprising returning archived data in the query result in response to the usage query based on the period of time indicated by the filter criteria.

24. The computer-readable medium of claim 21, further comprising instructions configured to cause the computing device to perform operations comprising:
determining a maximum number of concurrent users of an identified type of resource module during the period of time based on the parsed data; and
determining a number of concurrent resource module licenses required for use of the identified type of resource module based on the determined maximum number of concurrent users.

25. The computer-readable medium of claim 24, further comprising instructions configured to cause the computing device to perform operations comprising updating a number of concurrent resource module licenses available for use based on the number of concurrent speech resource module licenses required.

* * * * *